Jan. 8, 1957  D. R. ZUCK  2,776,718
HELICOPTER ROTOR

Filed Sept. 20, 1952  4 Sheets-Sheet 1

INVENTOR.
Daniel R. Zuck

Jan. 8, 1957 D. R. ZUCK 2,776,718
HELICOPTER ROTOR
Filed Sept. 20, 1952 4 Sheets-Sheet 2

INVENTOR.
Daniel R. Zuck

INVENTOR.
Daniel R. Zuck

Jan. 8, 1957   D. R. ZUCK   2,776,718
HELICOPTER ROTOR

Filed Sept. 20, 1952   4 Sheets-Sheet 4

INVENTOR.
Daniel R. Zuck

United States Patent Office 2,776,718
Patented Jan. 8, 1957

2,776,718

HELICOPTER ROTOR

Daniel R. Zuck, San Fernando, Calif.

Application September 20, 1952, Serial No. 310,607

4 Claims. (Cl. 170—160.13)

My invention relates to helicopter rotors, the improvement and simplification of the rotor and rotor control systems.

Although various types of rotors have been known and used for a considerable time, operation of the rotors is mostly based on direct manual control which feeds all the rotor's vibrations into the pilot's control stick. The rotor hinging of the known types is usually about more than one axis, resulting in an exceptionally complex assembly. Moreover the present number of hinging axes makes feathering of the known helicopter rotors in flight impossible. In convertiplane design, to reduce the drag of the rotor to a minimum, feathering of the rotor in flight is necessary.

It is therefore the primary object of this invention to reduce the complexity of a helicopter rotor, and to reduce the number of articulated axes about which the rotor blade pivots.

Another object is to provide a helicopter rotor which will transmit a minimum amount of vibration to the pilot's control stick and thereby reduce the pilot's fatigue in operating a helicopter.

Another object is to reduce the pilot effort in the control force required to control the helicopter rotor.

Another object in reducing the pilot effort required to control the helicopter rotor is to provide a control system which is feasible and within practical demands of pilot effort for rotors of large helicopters, which are contemplated but as yet not designed or built.

Another object is to provide a helicopter rotor with a reduced number of articulating pivoted axes which will make feathering of the rotor in flight feasible, thereby contributing to the development of a practical convertiplane which demands that the rotor be feathered in flight. The application of this rotor to a convertiplane will be disclosed to a greater extent in a succeeding patent application.

With these and other objects in view, the invention consists in the construction, arrangement and combination of the various parts of the device whereby the objects contemplated are attained, as hereinafter more fully set forth, pointed out in the claims and illustrated in the accompanying drawings, in which:

Figure 1 is a diagrammatic top view showing the main rotor, the fuselage in phantom lines, and the anti-torque vertical tail-rotor. Superimposed on the main rotor diameter is a relative velocity graph A, B, C, D, E, F and G, of the airfoil elements along the diameter of the rotor for an instant at a constant R. P. M. when the helicopter is moving horizontally at a constant velocity H. J and J₁ indicate the air velocity with respect to the advancing and retreating rotor blades.

It is common practice in helicopter rotor design to hingedly support the rotor blade to enable the blade tip to travel vertically, and also to add another hinge to enable the blade to trail or advance, with respect to the adjacent or opposite blade, in the plane of the rotor rotation; and further to add another pivot axis to allow the blade airfoil to rotate by means of a manual control direct to the pilot to regulate the airfoil angle of incidence.

In my device only one pivot axis is necessary to control and operate the rotor. The vertical and fore and aft pivoting axes in the plane of rotation of the rotor of the rotor blade are eliminated. These unnecessary pivot axes are dispensed with in my device thru freely mounting of the blade airfoil on a horizontal pivot and balancing the airfoil statically and aerodynamically with only a pilot-controlled aerodynamic control-surface mounted within the plan form of the main rotor airfoil to govern the angle of incidence of the blade.

Thru the elimination of the vertical pivot axis and the fore and aft pivot axis for the blade, it is now possible to bring this rotor to a complete stop while the machine is in flight to orient the airfoils to extend directly fore-and-aft of the fuselage, and to rotate the blade airfoils on their horizontal pivot axes until the chord line of the blade airfoils are vertical (in the plane of the rotor axis) with the trailing edges of all blades directed upwardly.

In a convertiplane where the takeoff characteristics of the helicopter is desired, and then conversion (while in flight) to airplane operation with conventional airplane wings for high speed horizontal flight, positioning of the rotor blade as described above trims the craft for reduction of drag upon such conversion. My device is particularly designed for such usage.

The principles incorporated in the design herein disclosed have been illustrated in somewhat diagrammatic form for the sake of simplicity, and details of the rotor structure and other structural features have been omitted.

Figure 1:
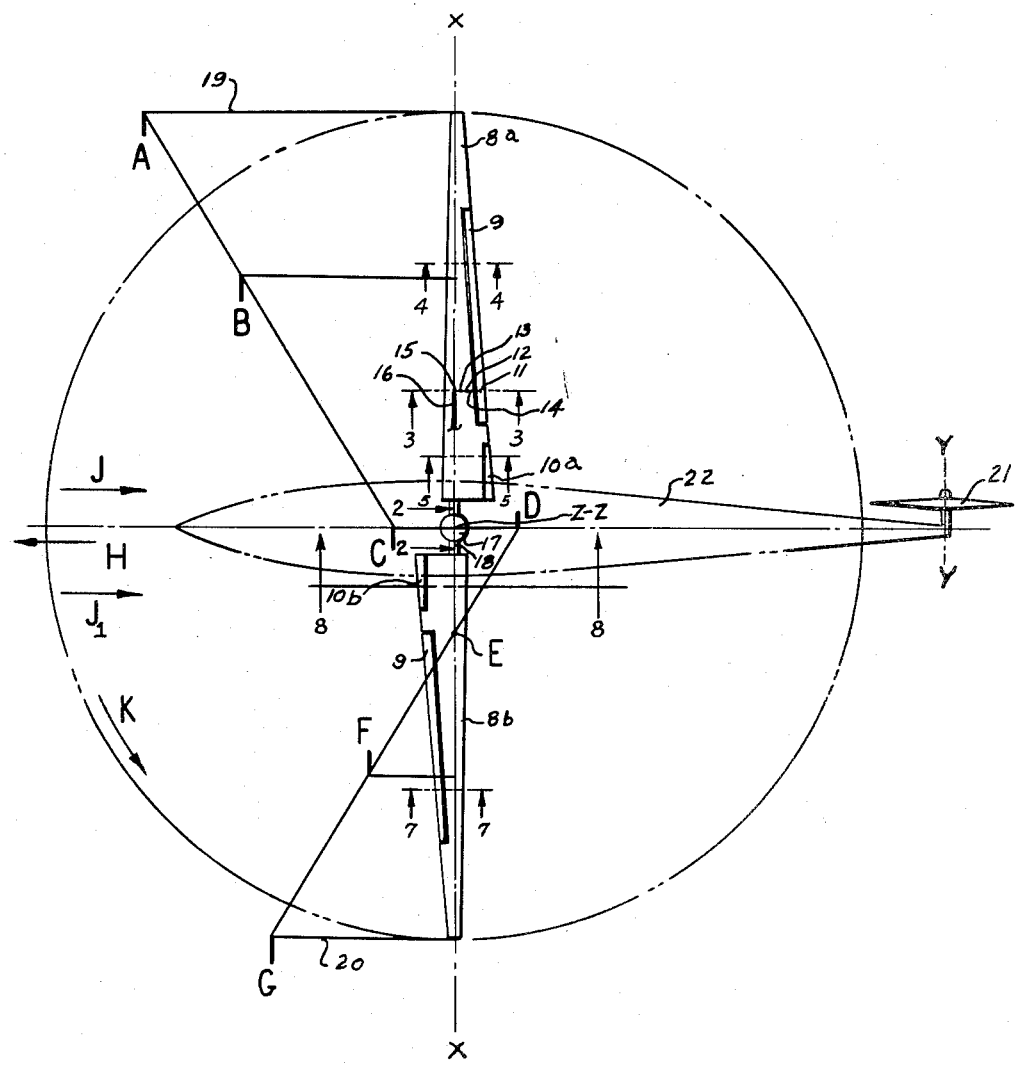
Figure 2:
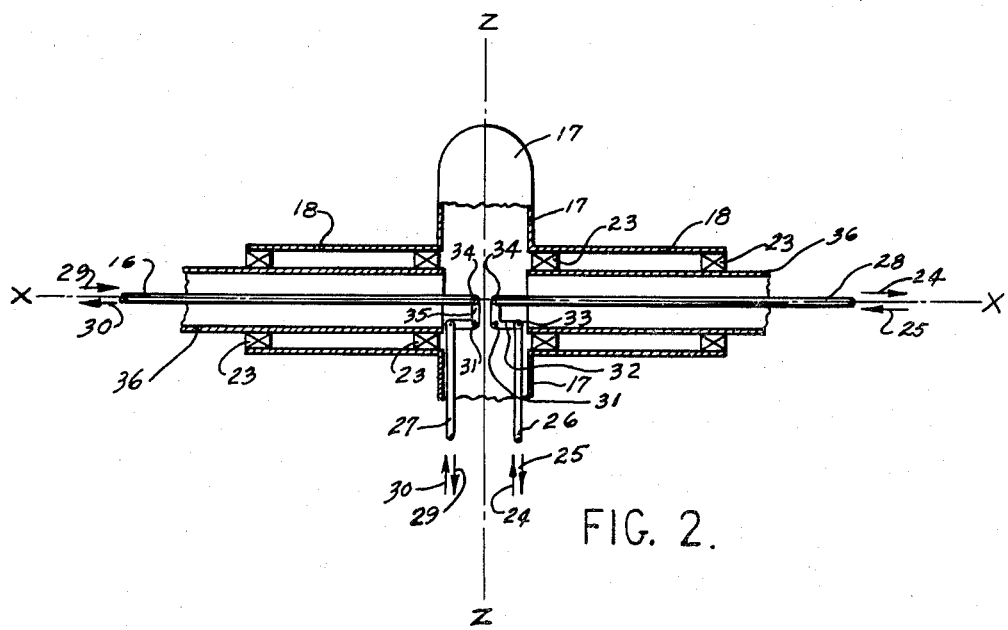
Figure 2 is a cross-sectional view thru the rotor hub on the line 2—2 in Figure 1.
Figure 3:
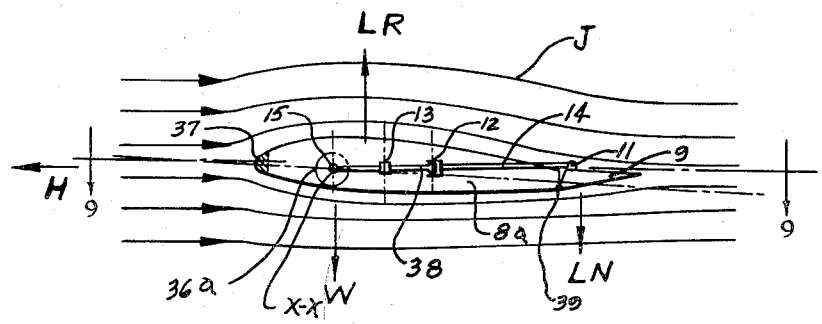
Figure 3 is a cross-sectional view thru the rotor blade on the line 3—3 in Figure 1.

In an embodiment chosen to illustrate the invention there is shown in Figure 1 a rotor assembly consisting essentially of: the blades or main lifting elements 8a and 8b which are identical, the pilot controlled control-surfaces 9, the trim tabs 10a and 10b which can be adjusted when the craft is on the ground but which remain fixed during flight, and the hub assembly 17 and 18 as shown in Figure 2, and the static balance weights 37 as shown in Figure 3.

Figure 8:
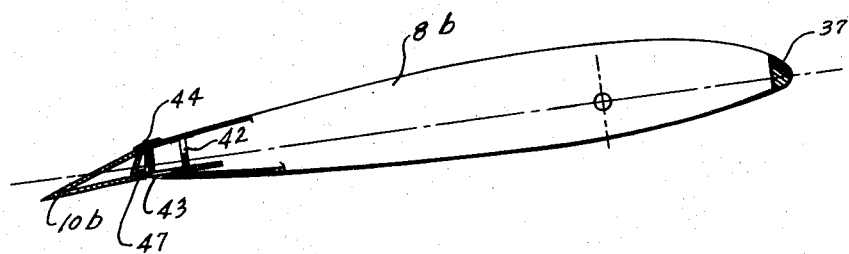
Figure 8 is an enlarged cross-sectional view through the rotor on line 8—8 of Figure 1.

Figure 8 is an enlarged cross-sectional view showing the structural attachment of the trim tab 10b to the main lifting element 8b. The trim tab 10b is hingeably attached to the lifting element 8b thru the piano hinge 44. Ground adjustment of the trim tab 10b is obtained thru adjustment of eye bolt 43 which threads into the tapped hole in member 42. Said tapped member 42 is rigidly fixed to the body of the main lifting member 8b. To change the angular position of 10b about hinge 44, pin 47 is removed which engages eye bolt 43 to tab 10b, and the eye bolt 43 is threaded into or out of member 42 until the eye bolt 43 locates the tab at the desired angle, and then 47 is reinserted permanently fixing the angular location of the trim tab 10b.

The rotor assembly, consisting essentially of the main lifting elements 8a and 8b, rotates about axis Z—Z, Figure 1 and Figure 2. The rotation is in the direction as indicated by the arrow K in Figure 1. The torque to rotate the rotor is supplied to the shaft 17 of the hub assembly in Figure 2.

The main lifting elements 8a and 8b are free to rotate to change the airfoil incidence on the axis X—X in Figure 1, and Figure 2. Elements 8a and 8b rotate on the bearings 23 supported in the hub bearing housing 18 with the shaft 36 connecting to the lifting elements 8a and 8b, and said shaft 36 protruding thru said bearing 23. The centrifugal thrust of the elements 8a and 8b due to rotational velocity about axis Z—Z are counterbalanced by a tension tie-rod interconnecting elements 8a and 8b thru the hub 17 and 18 adjacent the control rods 16 and 28. This is simply a structural member and is not shown for reasons of clarity in the illustration. This tie-rod eliminates the thrust on the bearings 23 due to the centrifugal force.

In Figure 3 the lifting element 8a is statically balanced by means of counterweight 37. The said counterweight 37 forward of axis X—X substantially balances all the weight aft of the said axis X—X. The lifting forces of the element 8a are also in aerodynamic balance. The major lift LR of the airfoil is upward and theoretically centers aft of the axis X—X. LR theoretically represents the center of the collective lifting forces over the entire chordwise area of the airfoil and, on the airfoil as shown for the element 8a and 8b, LR has a substantially zero chordwise movement throughout the range of the non-stalled angles of attack. The said force LR, producing a rotational moment of force, is counteracted by another force LN which is downward and theoretically centers approximately in the area noted by the arrow LN. The static gross weight of the helicopter body is downward and, represented by arrow W and acting on the axis X—X, places the forces LR and LN in equilibrium. The blade elements 8a and 8b maintain their airfoil incidence angle thru the balance of these forces. Any change of one individual force, W, LR, or LN, without a compensating change in the other forces will cause a change of the angles of incidence $\alpha$ and $\theta$, Figure 4 thru Figure 6.

The balance of forces as noted in Figure 3 duplicates substantially the balance of forces the applicant has disclosed in a prior Patent No. 2,347,230 in Figure 4A. The basic aerodynamic theory used in evolving the applicant's novel rotor system herein disclosed is substantially identical to the basic aerodynamic theory which evolved from the patentee's novel airplane control system in the said Patent No. 2,347,230.

Figure 4:
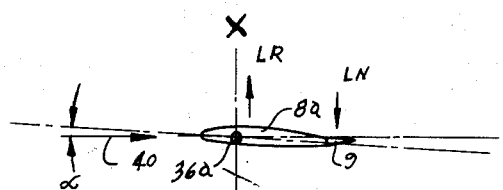
Figure 4 is a diagrammatic cross-sectional view thru the rotor on the line 4—4 in Figure 1.
Figure 7:
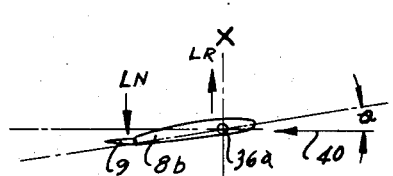
Figure 7 is a diagrammatic cross-sectional view thru the rotor on the line 7—7 in Figure 1.

It is apparent in Figure 3, Figure 4, and Figure 7 that the airfoil incidence angle $\alpha$ and $\theta$ may be varied by means of changing the position of the control surfaces 9 on their pivot axes 39. Raising the trailing edge of control surface 9 on pivot axis 39 increases the force LN, which rotates the blade elements 8a and 8b to increase the airfoil incidence angles $\theta$ and $\alpha$ on pivot axis X—X.

The control surface 9 is pilot-controlled through linkage 14 in Figure 3 and Figure 1, and the bellcrank 38 on pivot axis 13 which joins the link 14 at pivot axis 12. The pivot axis 13 is fixedly attached to the blade structure, element 8a. The control rods 16 and 28 are connected to bellcranks 38 in the blade elements 8a and 8b respectively at pivot axis 15.

In the Figure 1 is shown the mechanical control elements 16, 14, and pivot axes 15, 13, 12, and 11. These elements are also a part of the blade element assembly 8b but are not shown in this figure to afford greater clarity to the drawing.

The controls 16 and 28 extend from the pivot axis 15 in the blade elements 8a and 8b to pivot axes 34 in the hub assembly in Figure 2 and connected to bellcranks 32 and 35. Said bellcranks 32 and 35 are hingedly supported within the hub at the pivot axes 31. The control links 27 and 26 extend to a conventional helicopter wobble-plate control and thence to the pilot's control stick. Since these elements are conventional helicopter controls they are not illustrated in these drawings.

Figure 9:
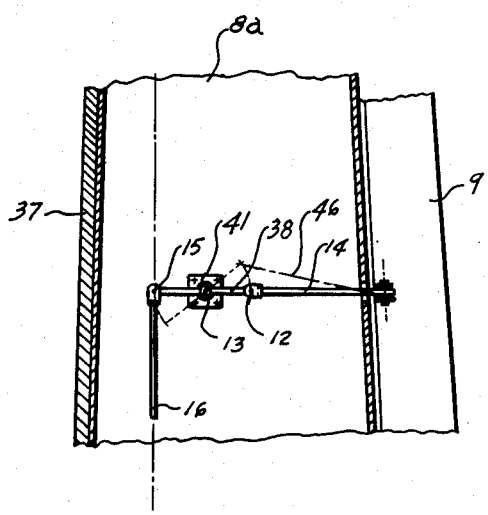
Figure 9 is a cross-sectional view taken on the line 9—9 of Figure 3.

A movement of the pilot's control stick to increase the pitch will produce a motion in the links 26 and 27 in the direction of arrows 24 and 30. The links 16 and 28 are moved in the direction of arrows 25 and 29. This produces a rotation in the bellcrank 38, which is mounted between supports 41, about pivot axis 13 in a counter-clockwise direction as shown by the centerlines 46 in Figure 9 which in turn raises the trailing edge control surface 9, thereby producing a greater force LN changing the blade elements 8a and 8b to larger angles of incidence, $\theta$ and $\alpha$. Thus the pilot's control to increase the pitch angle is effected in the blade elements 8a and 8b. To restore the blade angles to reduced pitch angles from the above said increased pitch angles, the controls are moved in the reverse direction.

The anti-torque rotor 21 in Figure 1 rotates about axis Y—Y. Said rotor is conventional and is included only to complete the helicopter illustration as a functional unit. Although it is not intended to imply that my novel main rotor control is suitable for this type of helicopter only, any helicopter type which employs a controllable rotor will find my device an improvement in the control and performance of the helicopter.

On Figure 1 is superimposed a velocity graph for the helicopter in horizontal forward flight at a velocity of H which for this illustration is 146 feet per second. The horizontal air velocities J and $J_1$, of opposite and equal velocities of 146 feet per second meet the rotor disc diameter. Since the rotor is revolving in the direction of arrow K, these said velocities J and $J_1$ add and subtract to the effective air velocities along the disc diameter of the rotor.

The effective air velocities along the diameter at the instant the rotor is normal to the fore and aft axis, as shown in Figure 1, are apparent from the examination of the graph. A is equal to 731 feet per second. B is equal to 500 feet per second. C on the right blade element 8a is 146 feet per second. D on the left blade element 8b is negative 146 feet per second. At E the air velocity on the rotor is zero. F is 200 feet per second. And G is 438 feet per second.

It is obvious from the study of these air velocities that, due to the higher air velocities on the blade element 8a at this instant of its rotation, greater dynamic lift is produced by blade 8a and thus produces a tendency for the machine to roll toward the blade element 8b. Therefore to restore equilibrium, it is necessary that the blade 8a reduce its angle of incidence $\alpha$ and that the blade element 8b increase its angle of incidence $\theta$.

The constant change in angle of incidence as the blade elements 8a and 8b traverse in each revolution is required to maintain equilibrium of the machine in horizontal flight. This change of incidence may be controlled thru the pilot's manual control fed into the links 26 and 27. However to reduce the vibration of the controls and difficulty of piloting of the helicopter, it is better to produce this change of angle of incidence automatically by an inherent characteristic of the rotor. In my rotor device the inherent design of the rotor produces an angle of incidence changing effect when the helicopter is in horizontal flight. In hovering flight the device has no adverse control effects. This feature is a separate and supplementary detail of the rotor system, as it is not necessarily a requisite part in the control of my rotor.

Figure 5:
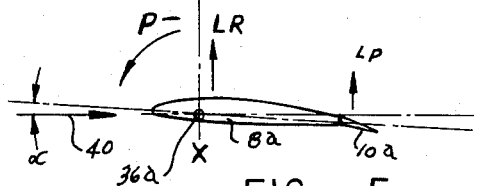
Figure 5 is a diagrammatic cross-sectional view thru the rotor on line 5—5 in Figure 1.
Figure 6:
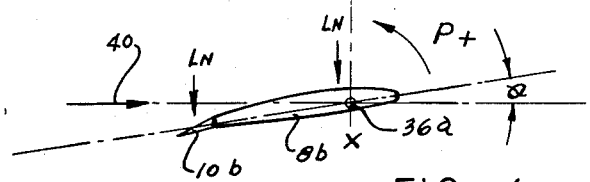
Figure 6 is a diagrammatic cross-sectional view thru the rotor on the line 6—6 in Figure 1.

In Figure 1 is noted trim tabs 10a and 10b. In Figure 5, tab 10a produces a force LP which produces a counter-clockwise rotational moment P negative which reduces the angle of incidence $\alpha$. In the Figure 6, 10b the air velocity arrow 40 is directed toward the trailing edge of the airfoil and produces a counterclockwise moment P positive which increases the angle of incidence $\theta$. The air velocity arrow 40 is directed toward the trailing edge due to $J_1$ being greater than the rotational velocity K at this section of the rotor. Only at point E do the velocity $J_1$ and the rotational velocity K equal each other. Inboard of the point E the air velocity $J_1$ is greater than the rotor velocity of the element $8b$. Outboard of the point E the velocity K of the rotor element $8b$ exceeds the air velocity $J_1$.

It is apparent from the above explanation that the blade elements $8a$ and $8b$, thru the aerodynamic reactions of $10a$ and $10b$, change their angles of incidence $\alpha$ and $\theta$ automatically during each increment of revolution to maintain equal lift on both sides of the helicopter as it flies in a horizontal direction. The pilot's control thru the aerodynamic action of control surfaces 9 can assist or override the action of $10a$ and $10b$, however.

The blade elements $8a$ and $8b$ are free to change their angles of incidence $\alpha$ and $\theta$ without being restrained by any mechanical linkage. The only obvious minor restraining influences are the control rods 16 and 28. However due to the small diameter and length, they can produce no detrimental effect on the angular rotational movement of the blade elements $8a$ and $8b$. It is anticipated that the said blade elements may be rotated 90 degrees or more on the horizontal axis X—X to permit the rotor blades to be feathered for convertiplane usage.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent structures.

The invention having been described, what is claimed and sought to be secured by Letters Patent is:

1. A helicopter rotor consisting of one or more blades, the blade airfoil comprising an airfoil section with a substantially zero chordwise movement of the center of lifting pressure, an aerodynamic control surface within the plan form of the rotor blade, a counterbalance to statically balance the blade assembly about the blade angle pitching axis, a horizontal pivot axis at the inboard end of the blade assembly to permit the blade to freely pivot to change the blade angle of incidence in response to the pilot-operated aerodynamic control surface, said pivot axis being located forward of the theoretical center of lifting air forces of the airfoil and tending to rotate the airfoil leading edge to a lesser angle of incidence, and said pilot-operated aerodynamic control surface supplying an oppositely rotating force to maintain a pre-selected or variable angle of incidence at the command of the pilot's control, a substantially fixed tab for ground adjustment only on each blade and located inboard of the pilot-operated control surface to automatically and differentially vary the blade incidence of the advancing and retreating blades as the aircraft is in horizontal flight, and as these trim tabs are directly acted upon by the horizontal airstream resulting from the helicopter's forward flight causing the advancing blade into the airstream to reduce its angle of incidence and the retreating blade from the airstream to increase its angle of incidence, thereby tending to preserve an automatic balance of lift about the center of rotation of the rotor during the horizontal flight of the aircraft.

2. A helicopter rotor consisting of one or more blades, the blade airfoil comprising an airfoil section with a substantially zero chordwise movement of the center of lifting pressure, an aerodynamic control surface within the plan form of the rotor blade, a counterbalance to statically balance the blade assembly about the blade angle pitching axis, a horizontal pivot axis at the inboard end of the blade assembly to permit the blade to freely pivot to change the blade angle of incidence in response to the pilot-operated aerodynamic control surface, said pivot axis being located forward of the theoretical center of lifting air forces of the airfoil and tending to rotate the airfoil leading edge to a lesser angle of incidence, and said pilot-operated aerodynamic control surface supplying an oppositely rotating force to maintain a pre-selected or variable angle of incidence at the command of the pilot's control, a rotatably mounted trim tab and adjustment means to vary the angle with respect to the blade airfoil, said trim tab being located on each blade inboard near the center of rotation of the rotor and on the trailing edge of the said blade to automatically and differentially vary the blade incidence of the advancing and retreating blades as the aircraft is in horizontal flight, and as these trim tabs are directly acted upon by the horizontal air-stream resulting from the helicopter's forward flight causing the advancing blade into the airstream to decrease its angle of incidence and the retreating blade from the airstream to increase its angle of incidence, thereby tending to preserve an automatic balance of lift about the center of the rotor during the horizontal flight of the aircraft.

3. A helicopter rotor comprising a hub, a blade having a leading edge and a trailing edge, an aerodynamic control surface within the plan form of the blade, said blade having a horizontal pivotal axis, a rotatable connection between the blade and the hub on the horizontal pivotal axis, said blade being free to rotate on said pivotal axis, said control surface having a horizontal rotatable mounting on the rotor blade adjacent the trailing edge of said blade, a pilot actuable control connection from said control surface through said hub, counterbalance means for the rotor blade forward of the horizontal axis arranged to position the center of gravity of the blade at said horizontal axis, said rotor blade having a theoretical center of lifting air forces located aft of the horizontal axis; said forces having an action tending to rotate the leading edge of the airfoil in a direction to reduce the angle of incidence, said control surface having positions adapted to supply a rotational force about the horizontal axis opposite to the lifting air forces whereby to maintain a preselected angle of incidence.

4. A helicopter rotor comprising a hub, a plurality of blades each having a leading edge and a trailing edge, an aerodynamic control surface within the plan form of each blade, each said blade having a horizontal pivotal axis, a hollow shaft forming a rotatable connection between the blade and the hub on the horizontal pivotal axis, said blade being free to rotate on said pivotal axis, said control surface having a horizontal rotatable mounting on the rotor blade adjacent the trailing edge of said blade, a pilot actuable control connection from said control surface through the blade and said shaft into said hub, a counterbalancing weight for the rotor blade forward of the horizontal axis arranged to position the center of gravity of the blade at said horizontal axis, said rotor blade having a theoretical center of lifting air forces located aft of the horizontal axis; said forces having an action tending to rotate the leading edge of the airfoil in a direction to reduce the angle of incidence, said control surface having upwardly and downwardly tilted positions in response to actuation of the pilot control connection adapted to supply a rotational force about the horizontal axis opposite to the lifting air forces whereby to maintain a preselected angle of incidence.

References Cited in the file of this patent

UNITED STATES PATENTS

| | | |
|---|---|---|
| 1,836,406 | Smith | Dec. 15, 1931 |
| 2,589,193 | Mayne | Mar. 11, 1952 |
| 2,627,928 | Mullgardt | Feb. 10, 1953 |
| 2,642,143 | Miller | June 16, 1953 |